(12) United States Patent
Kubota et al.

(10) Patent No.: US 11,192,588 B2
(45) Date of Patent: Dec. 7, 2021

(54) LOWER VEHICLE-BODY STRUCTURE OF ELECTRIC VEHICLE

(71) Applicant: MAZDA MOTOR CORPORATION, Hiroshima (JP)

(72) Inventors: Harumitsu Kubota, Hiroshima (JP); Nobuyuki Nakayama, Aki-gun (JP); Katsuhito Kouno, Hiroshima (JP); Ryohei Nakagiri, Hiroshima (JP); Toshihiro Takebayashi, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 99 days.

(21) Appl. No.: 16/821,794

(22) Filed: Mar. 17, 2020

(65) Prior Publication Data

US 2020/0385059 A1    Dec. 10, 2020

(30) Foreign Application Priority Data

Jun. 7, 2019  (JP) .............................. JP2019-107388

(51) Int. Cl.
| | |
|---|---|
| *B60J 7/00* | (2006.01) |
| *B62D 21/15* | (2006.01) |
| *B60K 1/04* | (2019.01) |
| *B62D 21/03* | (2006.01) |

(Continued)

(52) U.S. Cl.
CPC .............. *B62D 21/152* (2013.01); *B60K 1/04* (2013.01); *B62D 21/03* (2013.01); *B62D 25/025* (2013.01); *B62D 25/2036* (2013.01); *B60K 2001/0438* (2013.01)

(58) Field of Classification Search
CPC ....... Y02T 10/64; Y02T 10/72; Y02T 10/645; Y02T 10/70; B60L 2200/26; E05B 7/061; E05B 15/022; E05B 63/244; E05B 29/02; E05C 3/14

See application file for complete search history.

(56) References Cited

U.S. PATENT DOCUMENTS

| | | | |
|---|---|---|---|
| 2009/0058142 A1* | 3/2009 | Park ...................... | B62D 21/00 |
| | | | 296/193.07 |
| 2009/0186266 A1* | 7/2009 | Nishino ................ | H01M 50/20 |
| | | | 429/120 |

(Continued)

FOREIGN PATENT DOCUMENTS

JP   2009083601 A   4/2009

*Primary Examiner* — Kiran B Patel

(74) *Attorney, Agent, or Firm* — Studebaker & Brackett PC

(57) ABSTRACT

A lower vehicle-body structure of an electric vehicle includes a bending facilitating portion located outward of a bent portion of a kick-up and bends as a breakage starter in a lateral collision, earlier than the bent portion, to reduce the amount of projection from the bending facilitating portion toward an outer side and reduce the likelihood of interference with a battery. Each of left and right side portions in a vehicle width direction of a kick-up is bent downward from a position inward of a rear side frame toward a side sill and connected to the side sill. A bending facilitating portion that facilitates bending under a lateral-collision load is formed outward of a bent portion of the kick-up and an outer side portion of the battery, and either inward of an inner end of the rear side frame or at substantially the same position as the inner end.

20 Claims, 10 Drawing Sheets

(51) Int. Cl.
  *B62D 25/02*   (2006.01)
  *B62D 25/20*   (2006.01)

(56) References Cited

U.S. PATENT DOCUMENTS

| | | | |
|---|---|---|---|
| 2019/0143802 A1* | 5/2019 | Sato | B62D 27/065 |
| | | | 296/193.08 |
| 2020/0086928 A1* | 3/2020 | Morimoto | B62D 25/08 |
| 2020/0148027 A1* | 5/2020 | Aoki | B60H 1/246 |
| 2020/0156706 A1* | 5/2020 | Morimoto | B62D 25/2027 |
| 2020/0223303 A1* | 7/2020 | Saeki | B60K 1/04 |
| 2020/0361534 A1* | 11/2020 | Matsuda | B62D 25/145 |
| 2020/0361535 A1* | 11/2020 | Matsuda | B62D 21/04 |
| 2020/0361541 A1* | 11/2020 | Matsuda | B62D 27/023 |
| 2020/0376948 A1* | 12/2020 | Yamada | H01M 50/20 |
| 2020/0381686 A1* | 12/2020 | Yamada | B60L 50/64 |
| 2020/0385056 A1* | 12/2020 | Kubota | B62D 21/157 |
| 2020/0385058 A1* | 12/2020 | Kubota | B62D 21/02 |

\* cited by examiner

LOWER VEHICLE-BODY STRUCTURE OF ELECTRIC VEHICLE

BACKGROUND

Technical Field

The present disclosure relates to a lower vehicle-body structure of an electric vehicle in which a kick-up having a closed cross-sectional part and extending transversely between a pair of left and right side sills in a vehicle width direction is disposed between a front floor panel and a rear floor panel, a battery unit being disposed under both the floor panels.

Background Art

In general, in an electric vehicle in which a battery unit as a power source of a vehicle propelling motor is disposed between side frames of a front floor panel and a rear floor panel, a floor cross-member that is disposed at a middle portion in a vehicle front-rear direction of the front floor panel typically extends in a straight line in a vehicle width direction and couples together a pair of left and right side sills. Thus, there is little likelihood that the side frames or the floor cross-member may interfere with the battery unit in a lateral collision.

On the other hand, another cross-member is provided under the kick-up. As both end portions in the vehicle width direction of this cross-member are bent downward, it is easily breakable in a lateral collision, creating a concern that the side frames or the cross-member may interfere with the battery unit.

Japanese Patent Laid-Open No. 2009-83601 discloses a floor structure of an electric vehicle in which a first cross-member extending in a vehicle width direction is provided on a front floor panel, a second cross-member extending in the vehicle width direction is provided at a kick-up, and a battery unit as a power source of a vehicle propelling motor is disposed on an underside from the front floor panel to the kick-up. This structure has room for improvement in terms of avoiding interference between the cross-member at the kick-up and the battery unit in a lateral collision.

Therefore, the present disclosure provides a lower vehicle-body structure of an electric vehicle including a bending facilitating portion that is located outward of a bent portion of a kick-up and bends as a breakage starter in a lateral collision, earlier than the bent portion, so as to reduce the amount of projection (so-called overhang) from the bending facilitating portion toward an outer side and reduce the likelihood of interference with a battery unit.

SUMMARY

In a lower vehicle-body structure of an electric vehicle of the present disclosure, a kick-up having a closed cross-sectional part and extending transversely between a pair of left and right side sills in a vehicle width direction is disposed between a front floor panel and a rear floor panel, and a battery unit is disposed under both the floor panels. Each of left and right side portions in the vehicle width direction of the kick-up is bent downward from a position inward of a rear side frame toward one of the side sills and connected to the side sill. A bending facilitating portion that facilitates bending under a lateral-collision load is formed outward of a bent portion of the kick-up and an outer side portion of the battery unit, at a position inward of an inner end of the rear side frame or at substantially the same position as the inner end.

In this configuration, the bending facilitating portion is formed outward of the bent portion of the kick-up and the outer side portion of the battery unit, at a position inward of the inner end of the rear side frame or at substantially the same position as the inner end. Thus, the bending facilitating portion located outward of the bent portion of the kick-up bends as a breakage starter in a lateral collision, earlier than the bent portion, so as to reduce the amount of projection (so-called overhang) toward an outer side beyond the bending facilitating portion and reduce the likelihood of interference with the battery unit.

In one embodiment of the present disclosure, the bending facilitating portion is formed by a deformation facilitating bead extending in a vehicle front-rear direction. In this configuration, the deformation facilitating bead can be easily formed in a pressing process of the floor panel.

In one embodiment of the present disclosure, the closed cross-sectional part of the kick-up has expanded portions formed by expanding left and right end portions in the vehicle width direction of the closed cross-sectional part downward compared with a central portion thereof, and front ends of the rear side frames are supported by the expanded portions. A second deformation facilitating bead is formed on an upper side of each of the expanded portions. In this configuration, the second deformation facilitating beads on the upper sides of the expanded portions allow the expanded portions to be easily crushed in a lateral collision.

In one embodiment of the present disclosure, the deformation facilitating bead and the second deformation facilitating bead are formed at a corner between an upper wall and a vertical wall of the closed cross-sectional part. In this configuration, the corner that does not easily deform can be easily crushed.

In one embodiment of the present disclosure, a third deformation facilitating bead extending substantially in the vehicle front-rear direction is formed on an upper wall of a front end portion of the rear side frame. In this configuration, the third deformation facilitating bead undergoes upward bending deformation in a lateral collision and can thereby restrain the upper wall of the rear side frame from moving inward parallel to the vehicle width direction.

In one embodiment of the present disclosure, an opening is formed in a vertical wall at a position under a direction in which the third deformation facilitating bead is extended toward a vehicle front side. In this configuration, the opening formed in the vertical wall allows the vertical wall to be easily crushed in a lateral collision.

In one embodiment of the present disclosure, a plurality of second deformation facilitating beads are formed, and the opening is formed under a middle portion of the second deformation facilitating beads. In this configuration, the opening is formed under the middle portion of the second deformation facilitating beads, which can facilitate deformation of the middle portion in a lateral collision.

The present disclosure has an advantageous effect that the bending facilitating portion located outward of the bent portion of the kick-up bends as a breakage starter in a lateral collision, earlier than the bent portion, so as to reduce the amount of projection (so-called overhang) from the bending facilitating portion toward the outer side and reduce the likelihood of interference with the battery unit.

DETAILED DESCRIPTION

The present disclosure is a lower vehicle-body structure of an electric vehicle in which a kick-up having a closed cross-sectional part and extending transversely between a pair of left and right side sills in a vehicle width direction is disposed between a front floor panel and a rear floor panel, a battery unit being disposed under both the floor panels. To cause a bending facilitating portion located outward of a bent portion of the kick-up to bend as a breakage starter in a lateral collision, earlier than the bent portion, so as to reduce the amount of projection (so-called overhang) from the bending facilitating portion toward an outer side and reduce the likelihood of interference with the battery unit, this structure has a configuration in which each of left and right side portions in the vehicle width direction of the kick-up is bent downward from a position inward of a rear side frame toward one of the side sills and connected to the side sill, and a bending facilitating portion that facilitates bending under a lateral-collision load is formed outward of the bent portion of the kick-up and an outer side portion of the battery unit, at a position inward of an inner end of the rear side frame or at substantially the same position as the inner end.

Embodiment

Figure 1:
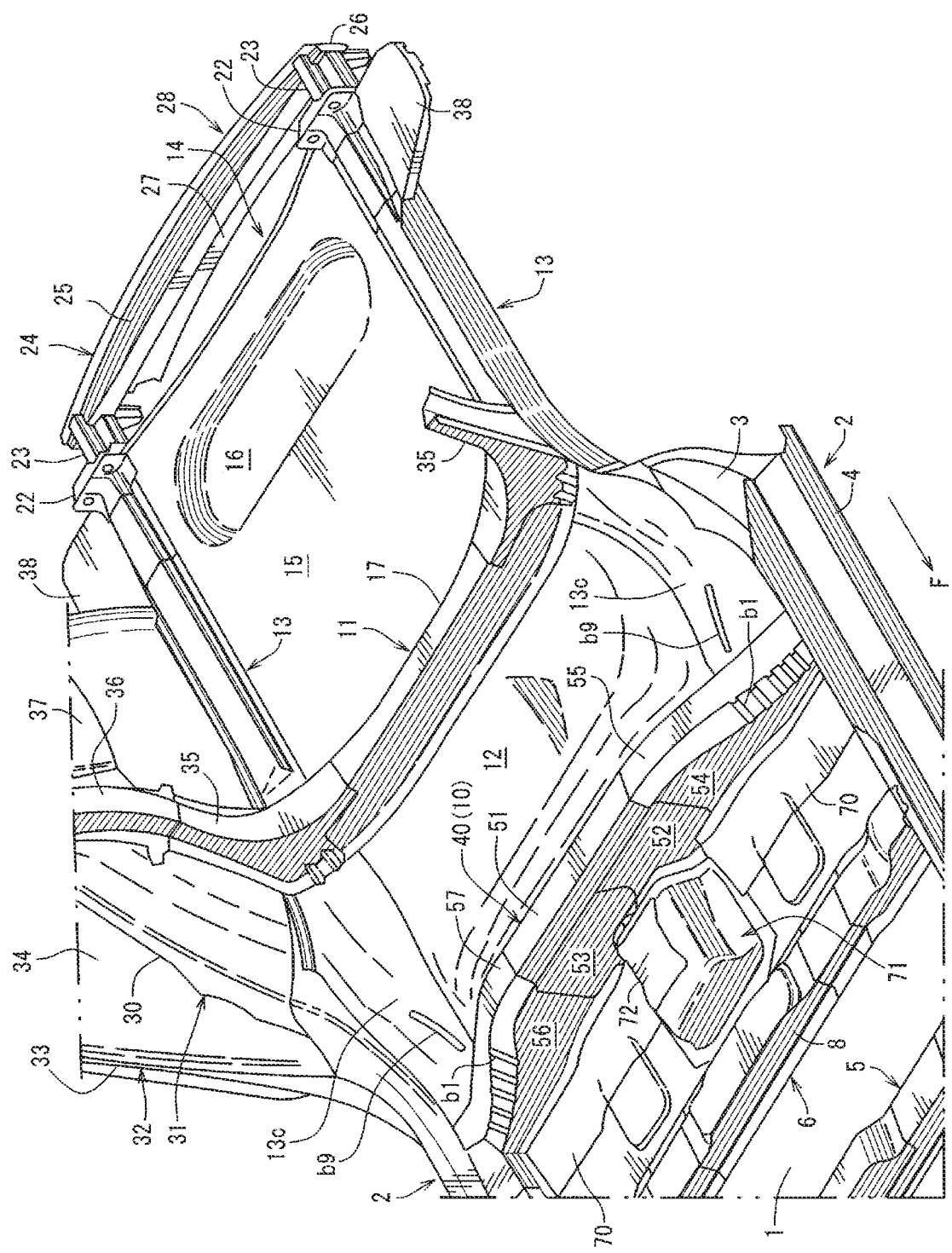
FIG. 1 is a perspective view showing a lower vehicle-body structure of an electric vehicle of the present disclosure.
Figure 2:
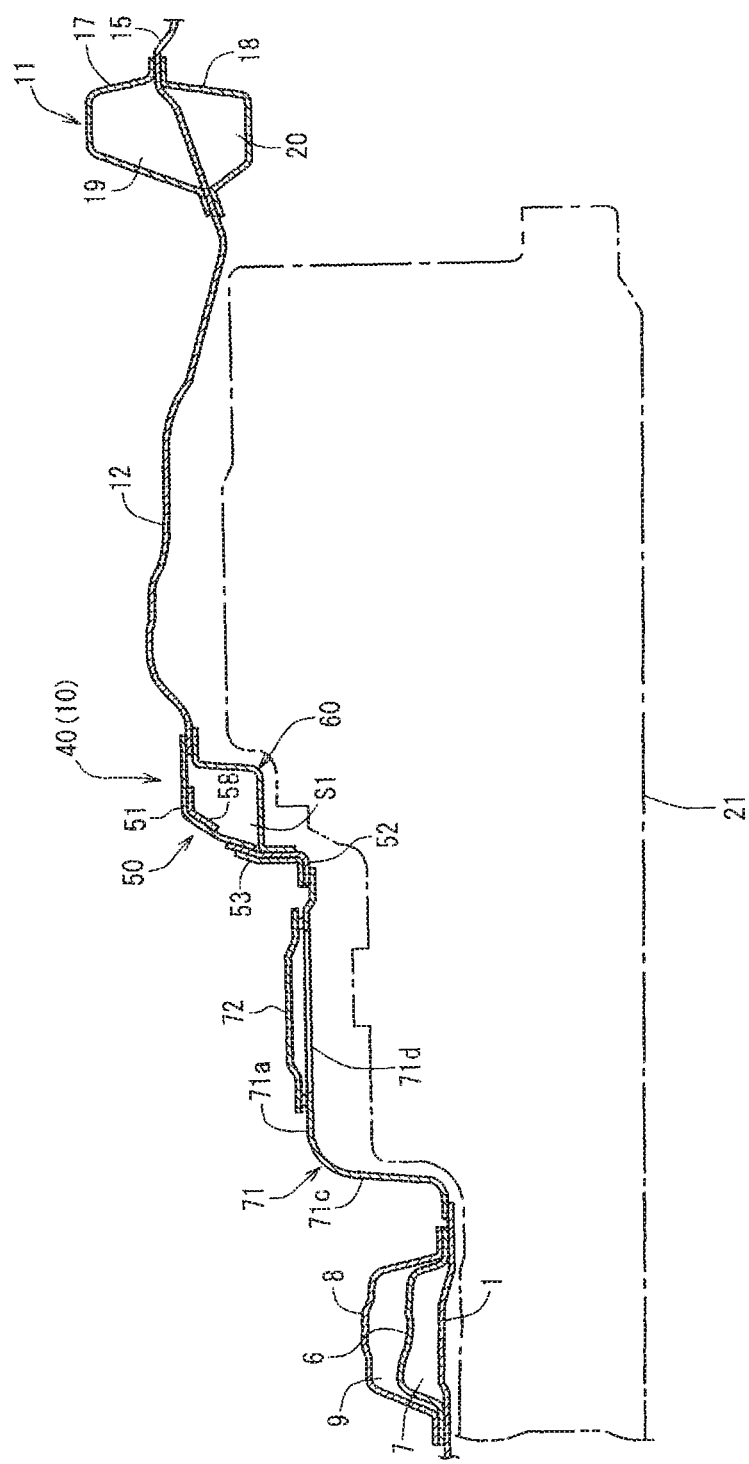
FIG. 2 is a sectional view showing main parts of the vehicle body structure of FIG. 1 in a section running along a vehicle front-rear direction at the center in a vehicle width direction.
Figure 3:
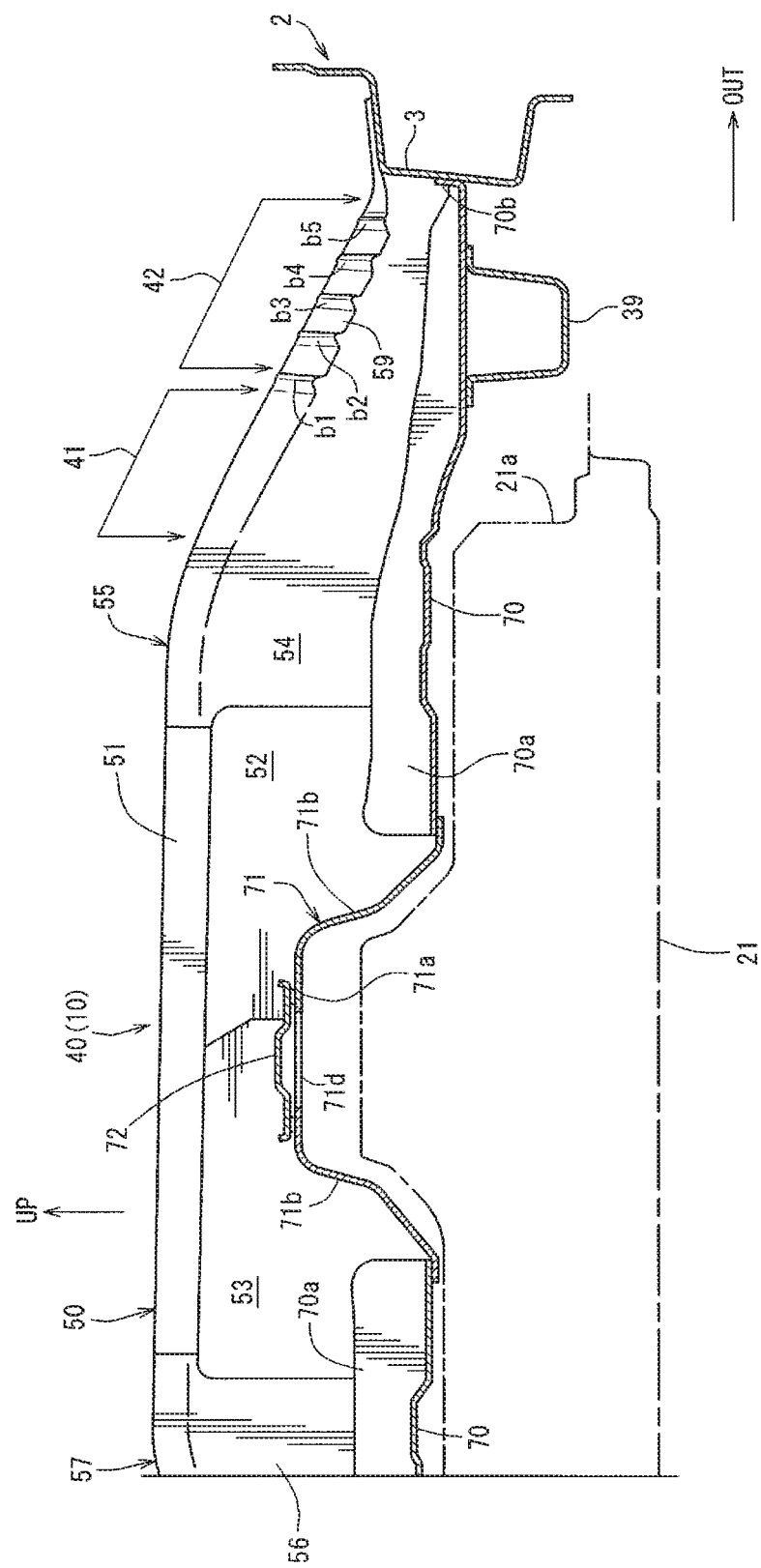
FIG. 3 is a sectional view showing main parts of the vehicle body structure of FIG. 1 in a section running along a vehicle width direction at floor panel thick-plate portions and a bulging portion.
Figure 4:
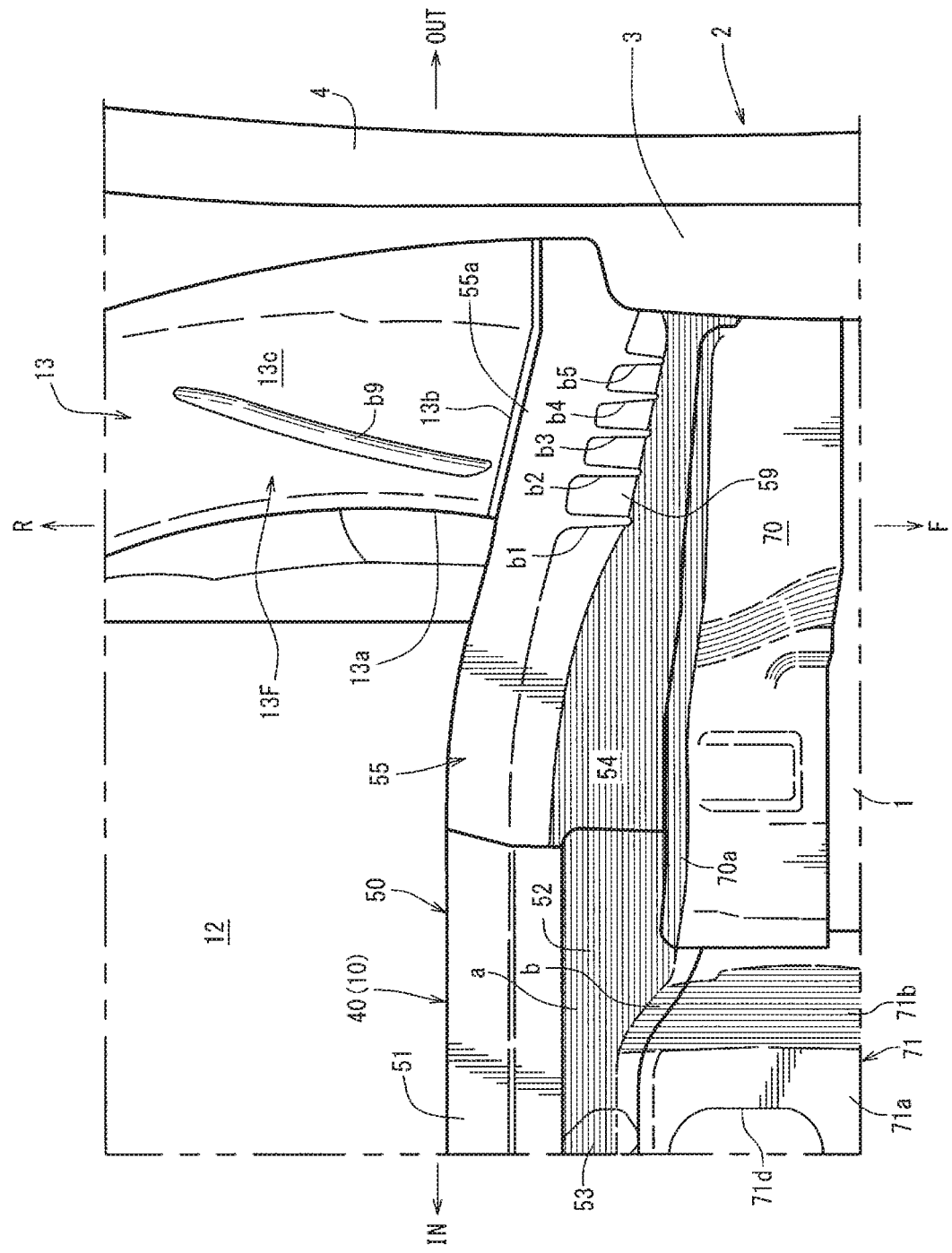
FIG. 4 is a perspective plan view of main parts of FIG. 1.
Figure 5:
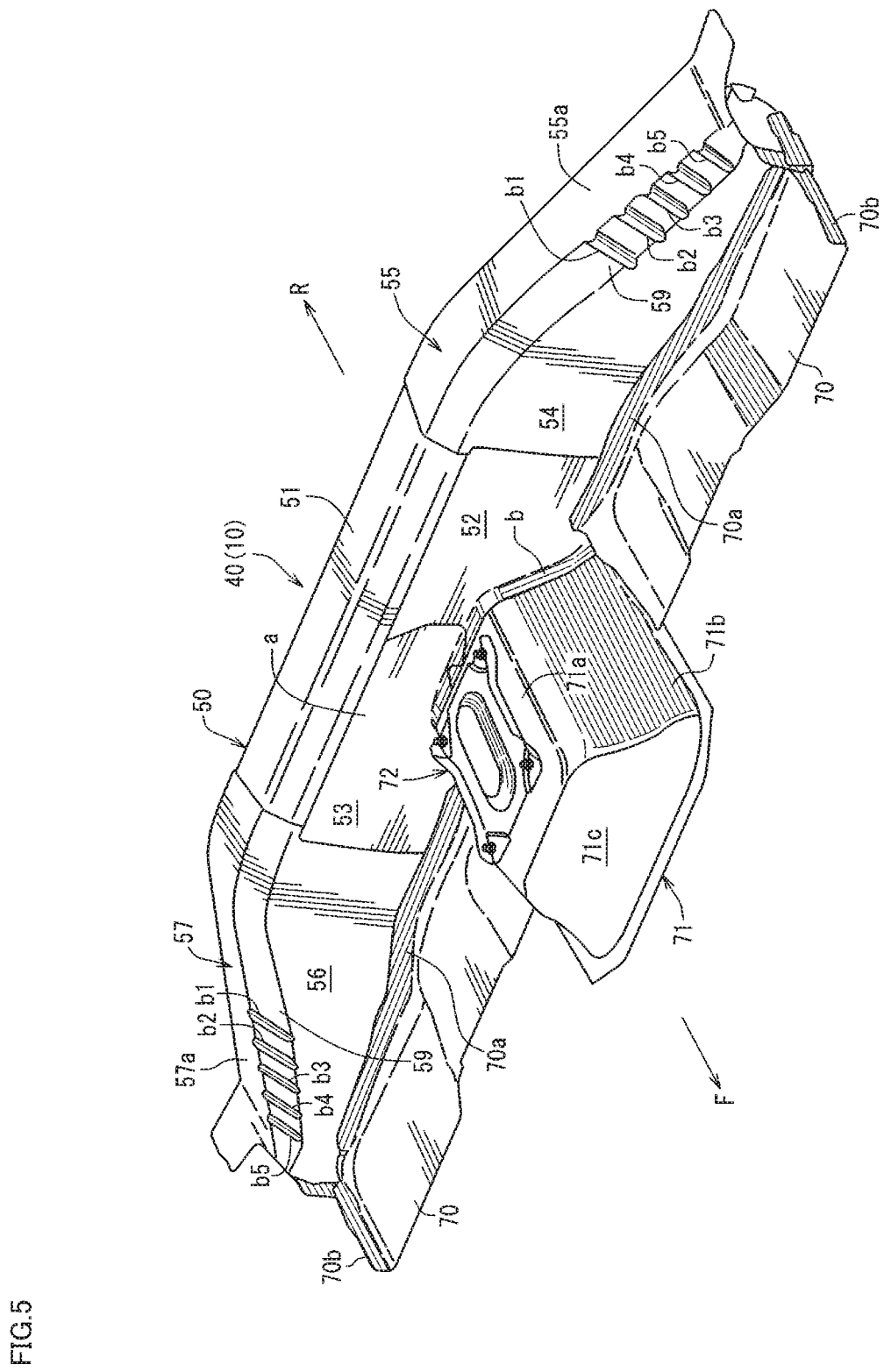
FIG. 5 is a perspective view of a cross-member including the floor panel thick-plate portion and the bulging portion.
Figure 6:
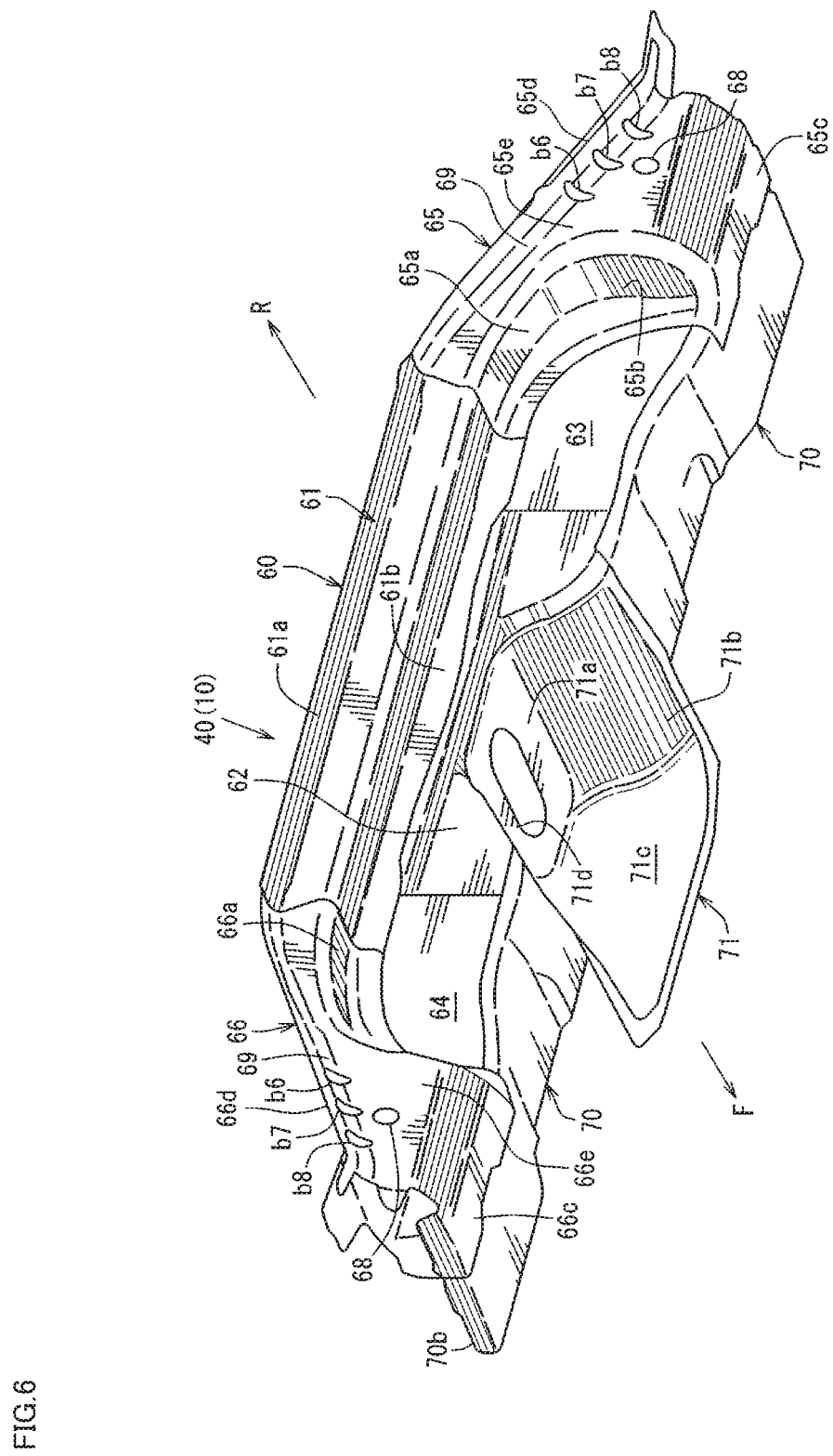
FIG. 6 is a perspective view of the cross-member with a cross-member upper portion of FIG. 5 removed.
Figure 7:
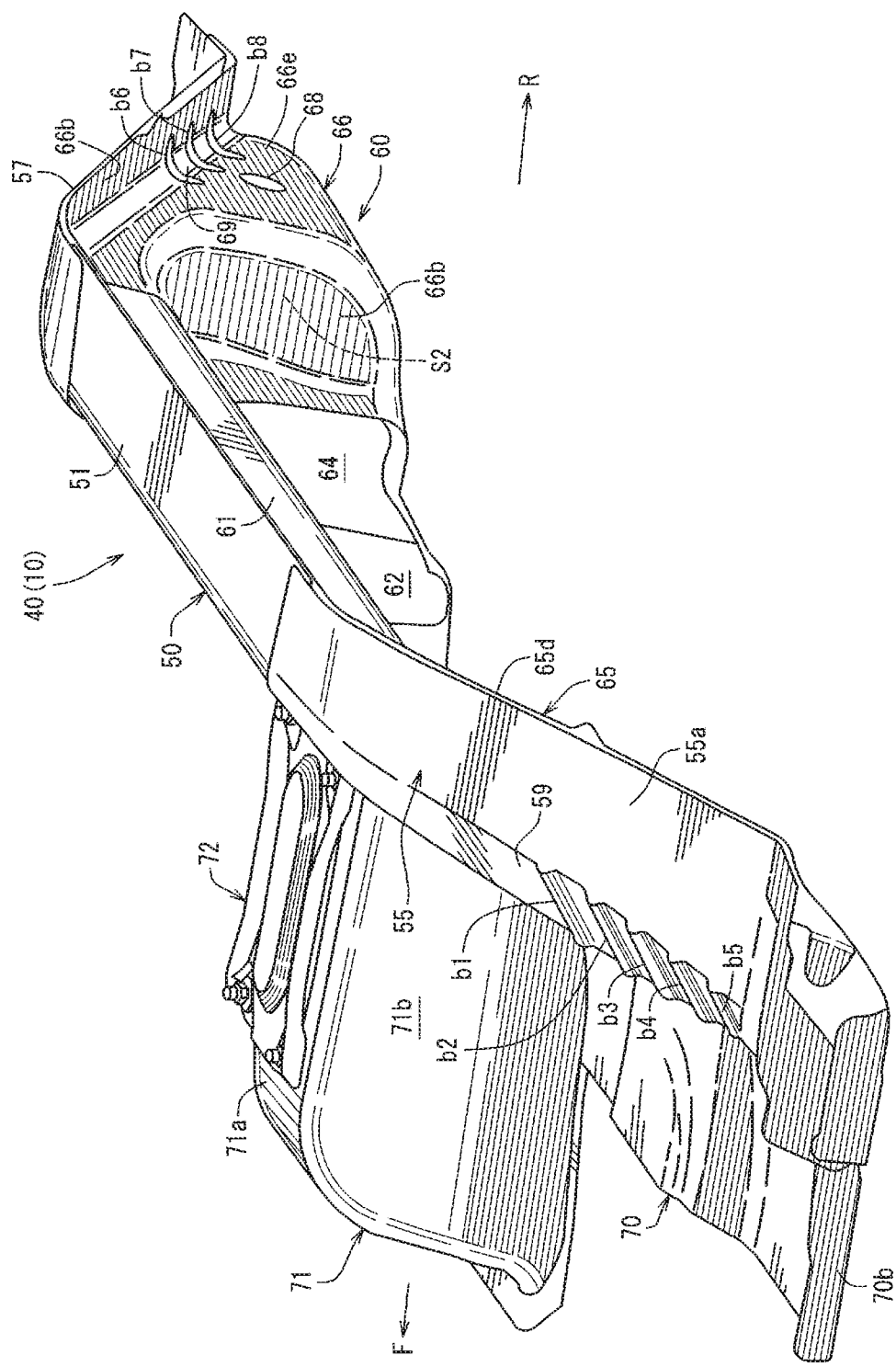
FIG. 7 is a perspective rear view of the cross-member including the floor panel thick-plate portion and the bulging portion.
Figure 8:
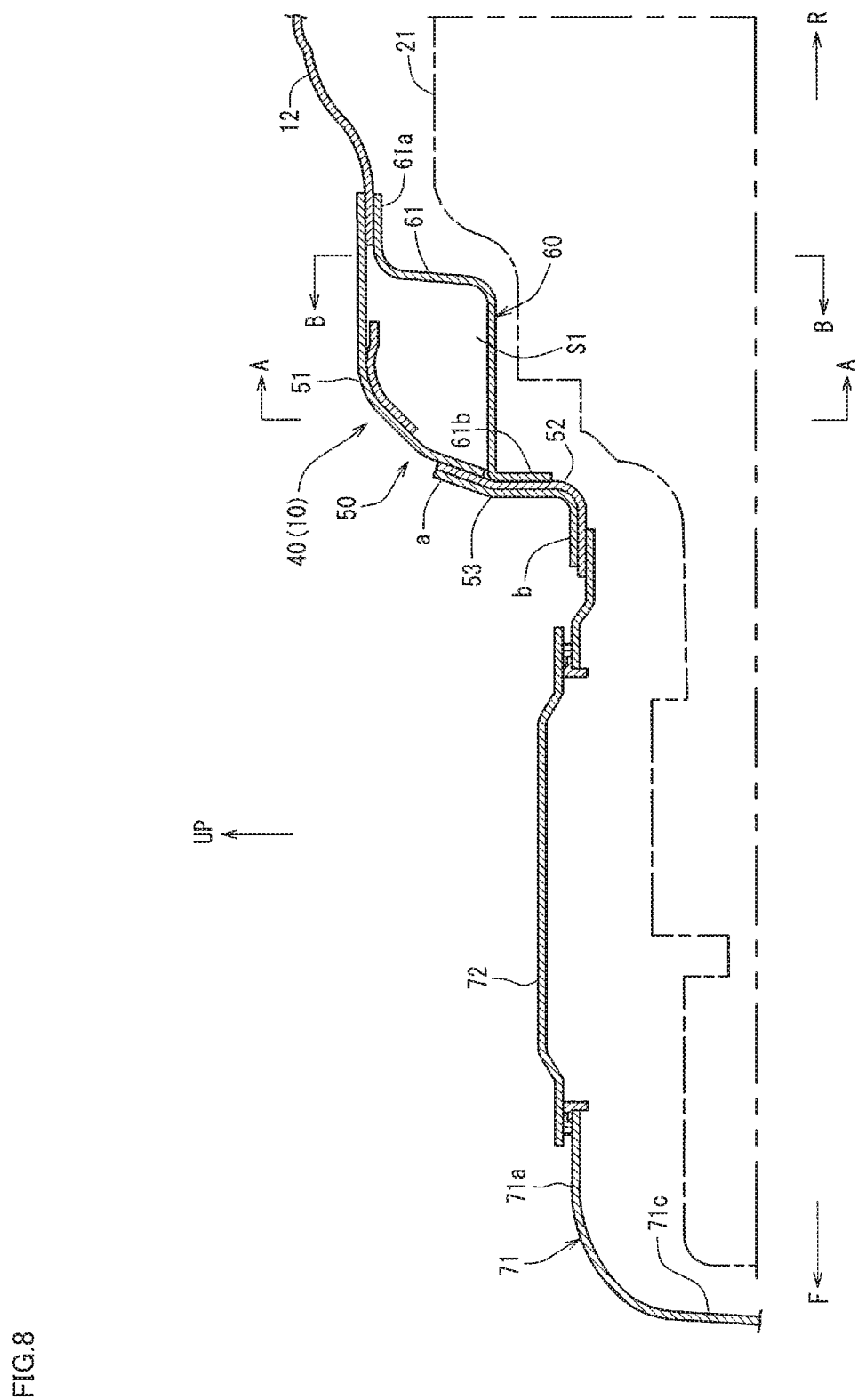
FIG. 8 is an enlarged sectional view of main parts of FIG. 2.

One embodiment of the present disclosure will be described in detail below based on the drawings. The drawings show a lower vehicle-body structure of an electric vehicle. FIG. 1 is a perspective top view showing the lower vehicle-body structure. FIG. 2 is a sectional view showing main parts of the vehicle body structure of FIG. 1 in a section running along a vehicle front-rear direction at the center in the vehicle width direction. FIG. 3 is a sectional view showing main parts of the vehicle body structure of FIG. 1 in a section running along the vehicle width direction at floor panel thick-plate portions and a bulging portion. FIG. 4 is a perspective plan view of main parts of FIG. 1. FIG. 5 is a perspective view of a cross-member including the floor panel thick-plate portions and the bulging portion. FIG. 6 is a perspective view of the cross-member with a cross-member upper portion of FIG. 5 removed. FIG. 7 is a perspective rear view of the cross-member including the floor panel thick-plate portion and the bulging portion. FIG. 8 is an enlarged sectional view of main parts of FIG. 2.

In FIG. 1, a front floor panel 1 forming a floor of a vehicle interior is provided, and side sills 2 as vehicle body strengthening members extending in the vehicle front-rear direction are provided on left and right sides in the vehicle width direction of the front floor panel 1. As shown in FIG. 1 and FIG. 3, each side sill 2 includes a side sill inner portion 3, a side sill reinforcement 4, and a side sill outer portion that is included in an outer panel of a vehicle body, and has a side sill closed cross-section extending in the vehicle front-rear direction.

As shown in FIG. 1, a front cross-member 5 (so-called No. 2 cross-member) extending in the vehicle width direction and coupling together the pair of left and right side sills 2, 2 is provided on an upper surface of the front floor panel 1 between the left and right side sills 2, 2. A closed cross-section extending in the vehicle width direction is formed between the front cross-member 5 and the front floor panel 1.

As shown in FIG. 1 and FIG. 2, a middle cross-member 6 (so-called No. 2.5 cross-member) extending in the vehicle width direction and coupling together the left and right side sills 2, 2 is provided rearward of the front cross-member 5 so as to be parallel to the front cross-member 5. A closed cross-section 7 extending in the vehicle width direction is formed between the middle cross-member 6 and the upper surface of the front floor panel 1. As shown in FIG. 1 and FIG. 2, a closed cross-section expanding member 8 is mounted on an upper surface of the middle cross-member 6 at a central portion in the vehicle width direction, and an expanded closed cross-section 9 is formed between the closed cross-section expanding member 8 and the middle cross-member 6.

As shown in FIG. 1, a kick-up 10 rising upward and then extending rearward is provided at a rear end portion of the front floor panel 1. A rear seat pan 12 above which a rear seat is installed is provided between the kick-up 10 shown in FIG. 1 and a rear cross-member 11 (so-called No. 4 cross-member) shown in FIG. 1 and FIG. 2. A rear end cross-member (so-called No. 4.5 cross-member) not shown that extends in the vehicle width direction and couples together a pair of left and right rear side frames 13, 13 is provided further rearward of the rear cross-member 11.

The rear end cross-member is provided parallel to the rear cross-member 11. A rear floor 15 is formed from the rear cross-member 11 to a rear end portion 14, and a trunk recess 16 protruding toward a vehicle lower side is formed at the center in the vehicle width direction of a rear portion of the rear floor 15.

As shown in FIG. 2, the rear cross-member 11 (so-called No. 4 cross-member) is composed of a rear cross-member upper portion 17 (so-called No. 4 cross-member upper portion) having a hat-shaped cross-section, and a rear cross-member lower portion 18 (so-called No. 4 cross-member lower portion) having an inverted hat-shaped cross-section. Closed cross-sections 19, 20 extending in the vehicle width direction are formed one on top of the other in an up-down direction, respectively between the rear cross-member upper portion 17 and the rear floor 15 and between the rear cross-member lower portion 18 and the rear floor 15.

The vehicle in this embodiment is an electric vehicle. As shown in FIG. 2, a battery unit 21 that supplies electricity to a vehicle propulsion driving motor is disposed under the front floor panel 1 and the rear seat pan 12 located rearward of the kick-up 10.

As shown in FIG. 1, the rear side frames 13 extending in the vehicle front-rear direction are joined and fixed to left and right side portions of the rear floor 15. As shown in FIG. 1 and FIG. 4, the rear side frames 13 are provided so as to extend from the rear end portion 14 toward a vehicle front side up to positions at which the rear side frames 13 overlap rear portions of the side sills 2. The rear cross-member 11 and the rear end cross-member are provided across the pair of left and right rear side frames 13, 13. The rear end cross-member is joined and fixed to a lower surface of the rear floor 15.

As shown in FIG. 1, a crash can 23 as a load absorbing part is mounted at a rear end of each rear side frame 13 through a set plate and a mounting plate 22, and a rear bumper beam 24 extending in the vehicle width direction is laterally suspended between the pair of left and right crash cans 23, 23.

The rear bumper beam 24 includes a bumper beam main body 25 having a shape of a hat lying on its side in cross-section, a closing plate 26 that closes a rear open side of the bumper beam main body 25, and a lower extension portion 27 that is joined and fixed to the closing plate 26 and extends downward along the entire width of the closing plate 26 in the vehicle width direction.

The rear bumper beam 24 extends in the vehicle width direction along a rear bumper (not shown), and the rear bumper beam 24 and the crash cans 23, 23 as load absorbing parts extending from left and right ends of the rear bumper beam 24 toward the vehicle front side constitute a rear bumper reinforcement 28.

Here, the rear side frames 13 extend in the vehicle front-rear direction respectively along left and right side portions of the rear floor 15 and are coupled at rear ends to front ends of the crash cans 23, 23. As shown in FIG. 1, a rear wheel well 31 composed of a rear wheel well inner portion 30 and a rear wheel well outer portion is provided outward in the vehicle width direction of each rear side frame 13.

On the other hand, as shown in FIG. 1, a center pillar-less door opening 33 is formed by the side sill 2 extending in the vehicle front-rear direction at a lower part, a quarter pillar 32 extending in a vehicle up-down direction at a rear part, a roof side rail extending in the vehicle front-rear direction at an upper part, a hinge pillar extending in the vehicle up-down direction at a front part, and a front pillar coupling together a front end of the roof side rail and an upper end of the hinge pillar in an oblique direction. The door opening 33 is configured to dispose therein a front door and a rear door forming a double door.

The following reference signs in FIG. 1 denote the following parts: 34 is side panel inner portions; 35 is lower brace members extending upward along the rear wheel well inner portions 30 from left and right side portions of the rear cross-member 11, particularly the rear cross-member upper portion 17; 36 is upper brace members extending further upward along the rear wheel well inner portions 30 from the lower brace members 35; 37 is damper support portions; and 38 is floor side panels formed so as to protrude from rear portions of the rear side frames 13 outward in the vehicle width direction.

In FIG. 3, reference sign 39 denotes a floor frame having an inverted hat-shaped cross-section that is joined and fixed to a lower portion of the front floor panel 1. As shown in FIG. 1, the kick-up 10 extends transversely between the pair of left and right side sills 2, 2 in the vehicle width direction at a position between the front floor panel 1 and the rear seat pan 12 as a rear floor panel, and the kick-up 10 is configured to form a closed cross-sectional part with a cross-member 40 (so-called No. 3 cross-member) to be described later.

As shown in FIG. 1, the lower vehicle-body structure of a vehicle of this embodiment includes the middle cross-member 6 (so-called No. 2.5 cross-member) that is a first cross-member disposed at a middle portion in the vehicle front-rear direction of the front floor panel 1 so as to extend transversely in the vehicle width direction, and the cross-member 40 (so-called No. 3 cross-member) that is a second cross-member disposed at the kick-up 10 between the front floor panel 1 and the rear seat pan 12 as the rear floor panel so as to extend transversely in the vehicle width direction, with at least a central portion in the vehicle width direction of the cross-member 40 located at a higher position than an upper surface of the middle cross-member 6. Here, the middle cross-member 6 and the cross-member 40 are vehicle body strengthening members that couple together the pair of left and right side sills 2, 2 in the vehicle width direction.

The lower vehicle-body structure includes the battery unit 21 disposed under at least the front floor panel 1 down to the position of a rear end of the front floor panel 1. In this embodiment, as shown in FIG. 2, the battery unit 21 is disposed under the front floor panel 1 and the rear seat pan 12.

As shown in FIG. 1 and FIG. 5, thick-plate portions 70 as high-strength portions coupled to the pair of left and right side sills 2, 2 are provided at the rear end of the front floor panel 1, at a lower end of the kick-up 10. The thick-plate portions 70 are high-strength portions relative to the front floor panel 1, and the plate thickness of the thick-plate portions 70 is set to be larger than that of the front floor panel 1. The thick-plate portions 70 are provided to enhance the proof stress of the rear end portion of the front floor panel 1 against a lateral-collision load and avoid interference between the cross-member 40 of the kick-up 10 and the battery unit 21.

As shown in FIG. 1 and FIG. 5, a bulging portion 71 coupled to a vertical wall of the kick-up 10 (see a cross-member upper portion central left lower part 52 and a cross-member upper portion central right lower part 53 to be described later) is formed at the center of the rear end portion of the front floor panel 1.

As shown in FIG. 5, the bulging portion 71 integrally has a top part 71a, left and right side parts 71b, 71b, and a front part 71c, and is formed so as to open at a lower side and a rear side. As shown in FIG. 2, an opening 71d is formed in the top part 71a of the bulging portion 71, and a lid member 72 that removably covers the opening 71d is mounted on the top part 71a.

As shown in FIG. 3 and FIG. 5, the thick-plate portions 70, 70 at the rear end of the front floor panel 1 are divided as left and right portions, with the bulging portion 71 provided at the center in the vehicle width direction forming a border therebetween. The cross-member 40 (so-called No. 3 cross-member) forming the kick-up 10 includes a cross-member upper portion 50 shown in FIG. 5 and a cross-member lower portion 60 shown in FIG. 6, and these portions form a cross-member closed cross-section S1 extending in the vehicle width direction (see FIG. 2).

As shown in FIG. 5, the cross-member upper portion 50 includes: a cross-member upper portion central upper part 51 located at an upper portion at the center in the vehicle width direction; the cross-member upper portion central left lower part 52 and the cross-member upper portion central right lower part 53 as the kick-up central vertical walls located respectively on the left and right sides under the cross-member upper portion central upper part 51; a cross-member upper portion side part 55 having a kick-up side vertical wall 54 and located on the left side in the vehicle width direction of the cross-member upper portion central upper part 51 and the cross-member upper portion central left lower part 52; a cross-member upper portion side part 57 having a kick-up side vertical wall 56 and located on the right side in the vehicle width direction of the cross-member upper portion central upper part 51 and the cross-member upper portion central right lower part 53; and a cross-member reinforcement 58 joined and fixed to an inner surface of a corner of the cross-member upper portion central upper part 51 as shown in FIG. 2 and FIG. 8.

As shown in FIG. 8, the cross-member upper portion central left lower part 52 and the cross-member upper portion central right lower part 53 as the kick-up central vertical walls are joined and fixed to each other at ends on a center side in the vehicle width direction, and a lower end of the cross-member upper portion central upper part 51 is joined and fixed to rear surfaces of upper ends a of these parts 52, 53. Lower-end bent portions b of the cross-member upper portion central left lower part 52 and the cross-member upper portion central right lower part 53 are bent along the bulging portion 71, and lower surfaces of the lower-end bent portions b of these parts 52, 53 are joined and fixed to the bulging portion 71.

As shown in FIG. 6, the cross-member lower portion 60 is formed by integrally coupling together a cross-member lower portion central upper part 61 located at an upper portion at the center in the vehicle width direction; a cross-member lower portion central lower part 62 located under the cross-member lower portion central upper part 61; a cross-member lower portion left lower part 63 and a cross-member lower portion right lower part 64 located respectively on the left and right sides in the vehicle width direction of the cross-member lower portion central lower part 62; a cross-member lower portion side part 65 located on the left side in the vehicle width direction of the cross-member lower portion central upper part 61 and the cross-member lower portion left lower part 63; and a cross-member lower portion side part 66 located on the right side in the vehicle width direction of the cross-member lower portion central upper part 61 and the cross-member lower portion right lower part 64.

As shown in FIG. 8, an upper-end bent portion 61a of the cross-member lower portion central upper part 61 is welded in a state where three layers of the upper-end bent portion 61a, a front end portion of the rear seat pan 12, and a rear end portion of the cross-member upper portion central upper part 51 overlap one another, while a lower-end bent portion 61b of the cross-member lower portion central upper part 61 is welded in a state where three layers of the lower-end bent portion 61b, the cross-member upper portion central left lower part 52, and the cross-member upper portion central right lower part 53 overlap one another.

As shown in FIG. 5, the thick-plate portions 70, 70 formed as divided left and right portions are coupled together through the cross-member upper portion central left lower part 52 and the cross-member upper portion central right lower part 53 that are the kick-up central vertical walls having a larger plate thickness relative to the bulging portion 71.

Thus, the cross-member upper portion central left lower part 52 and the cross-member upper portion central right lower part 53 as the kick-up central vertical walls resistant to bending deformation in the up-down direction are used to reinforce the part of the rear end of the front floor panel 1 across the bulging portion 71 (so-called tunnel portion) at which the high-strength portion is interrupted by the bulging portion 71.

Moreover, as shown in FIG. 5, bent portions 70a, 70a bent upward are integrally formed at rear ends of the left and right thick-plate portions 70, 70, and the bent portions 70a, 70a are joined and fixed to the cross-member upper portion central left lower part 52 and the cross-member upper portion central right lower part 53 as the kick-up central vertical walls. Thus, the bent portions 70a are formed at the rear ends of the thick-plate portions 70 to enhance the strength against a lateral collision.

Here, the cross-member upper portion central left lower part 52 and the cross-member upper portion central right lower part 53 that are the kick-up central vertical walls coupling together the left and right thick-plate portions 70, 70 are formed by thick plates having a larger plate thickness than the other kick-up side vertical walls 54, 56. Thus, the strength of the kick-up central vertical walls (see the cross-member upper portion central left lower part 52 and the cross-member upper portion central right lower part 53) can be easily enhanced by simply changing the plate thickness.

As shown in FIG. 5 and FIG. 8, the kick-up central vertical walls (the cross-member upper portion central left lower part 52 and the cross-member upper portion central right lower part 53) coupling together the left and right thick-plate portions 70, 70 are coupled to the second cross-member, particularly, the cross-member upper portion central upper part 51, disposed above these kick-up central vertical walls. Thus, the proof stress against a lateral collision is further enhanced.

As shown in FIG. 3, the bent portions 70a of the thick-plate portions 70 are joined and fixed not only to the kick-up central vertical walls but also to the kick-up side vertical walls 54, 56. As shown in FIG. 3, a side bent portion 70b rising upward is integrally formed at an outer end in the vehicle width direction of each thick-plate portion 70, and the side bent portion 70b is joined and fixed to the side sill inner portion 3.

As shown in FIG. 3 to FIG. 5, each of left and right side portions in the vehicle width direction of the kick-up 10 formed by the cross-member 40 (so-called No. 3 cross-member) is bent downward from an inner position 13a (i.e., an inner end) in the vehicle width direction of a front portion 13F of the rear side frame 13 toward one of the side sills 2 and connected to the side sill 2.

In particular, an upper surface of the cross-member upper portion central upper part 51 is formed in a straight line along the entire width thereof in the vehicle width direction. A portion on the inner side in the vehicle width direction of each of the cross-member upper portion side parts 55, 57 is formed in a straight line so as to be continuous with the cross-member upper portion central upper part 51, while a portion of each of these parts 55, 57 on the outer side from that portion in the vehicle width direction is bent downward toward one of the side sills 2 so as to be raised on the inner side and lowered on the outer side. An inner bent portion 41 and an outer bent portion 42 are continuously formed in an upper surface of each of the cross-member upper portion side parts 55, 57 (see FIG. 3).

A deformation facilitating bead b1 extending in the vehicle front-rear direction and protruding toward a front upper side that serves as a bending facilitating portion that facilitates bending under a lateral-collision load is formed outward of the inner bent portion 41 of the kick-up 10 and an outer side portion 21a of the battery unit 21, at a position inward of the inner position 13a (i.e., the inner end) in the vehicle width direction of the rear side frame 13 or at substantially the same position as the inner end.

Thus, the deformation facilitating bead b1 as a bending facilitating portion located outward of the inner bent portion 41 of the kick-up 10 bends as a breakage starter in a lateral collision of the vehicle, earlier than the inner bent portion 41, so as to reduce the amount of projection (so-called overhang) toward the vehicle-width-direction outer side beyond the deformation facilitating bead b1 and reduce the likelihood of interference with the battery unit 21.

Figure 9:
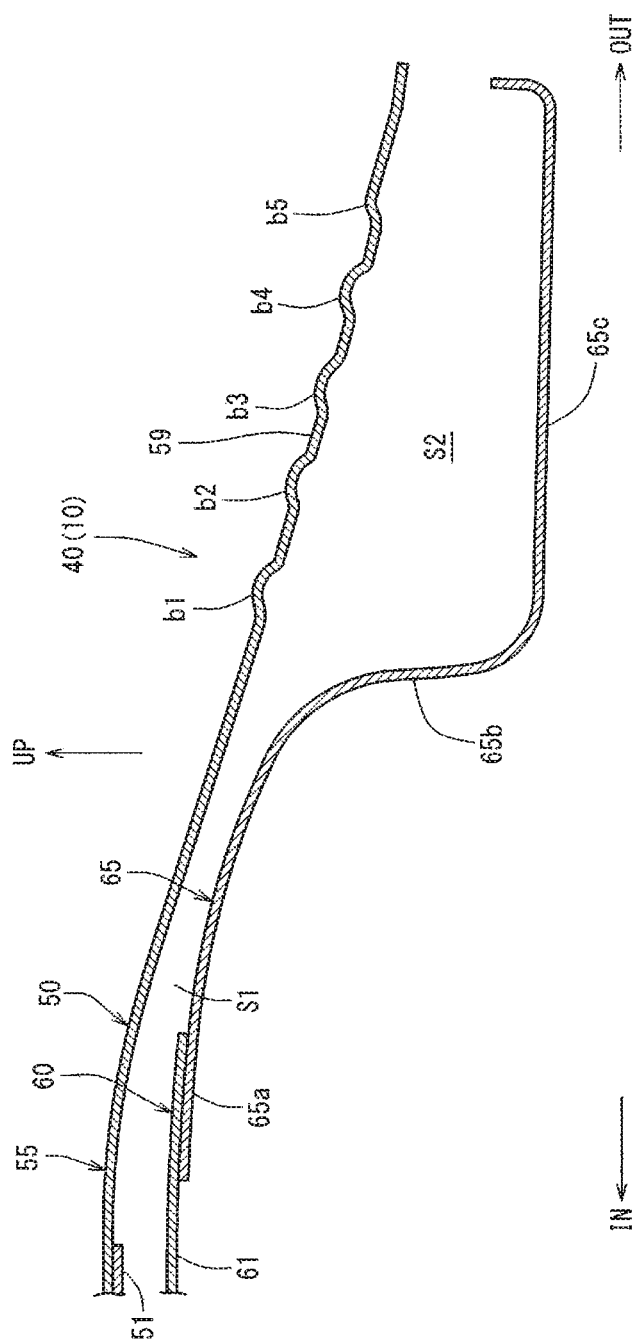
FIG. 9 is a sectional view taken along line A-A of FIG. 8.
Figure 10:
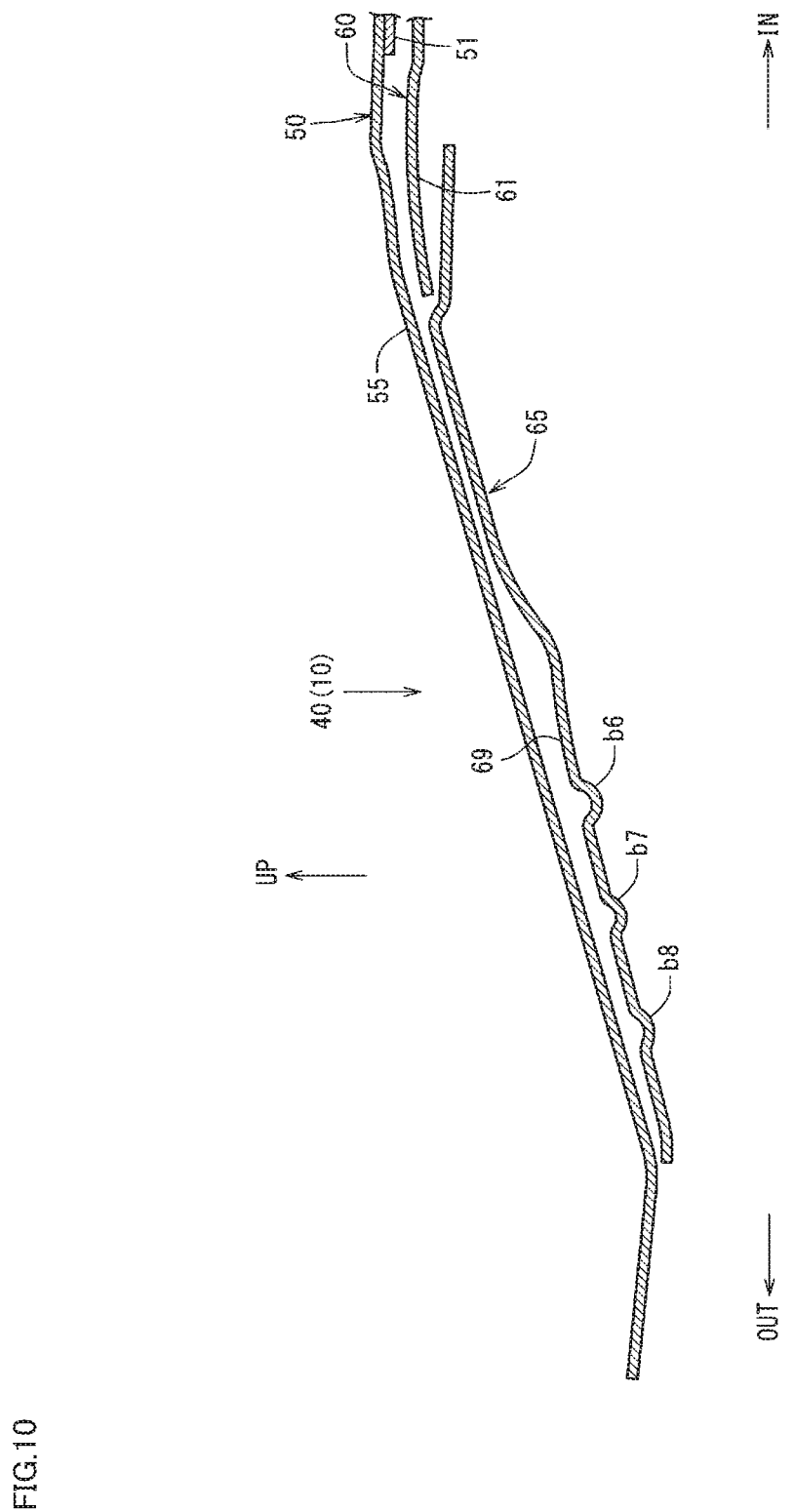
FIG. 10 is a sectional view taken along line B-B of FIG. 8.

FIG. 9 is a sectional view taken along line A-A of FIG. 8, and FIG. 10 is a sectional view taken along line B-B of FIG. 8. As shown in FIG. 7 and FIG. 9, the cross-member closed cross-section S1 of the kick-up 10 has expanded portions S2 formed by expanding left and right end portions in the vehicle width direction of the cross-member closed cross-section S1 downward compared with a central portion thereof.

Specifically, as shown in FIG. 6, FIG. 7, and FIG. 9, the cross-member lower portion side parts 65, 66 forming the cross-member lower portion 60 are provided with perpendicular walls 65b, 66b extending downward from intermediate points in the vehicle width direction of the upper walls 65a, 66a at which the upper walls 65a, 66a face the inner bent portions 41; bottom walls 65c, 66c extending in the vehicle width direction from lower ends of the perpendicular walls 65b, 66b; upper end walls 65d, 66d inclined so as to correspond to the inner bent portions 41 and the outer bent portions 42 and be raised on the inner side and form a bottom on the outer side; and vertical walls 65e, 66e integrally coupling together these walls 65a, 65b, 65c, 65d and these walls 66a, 66b, 66c, 66d in the up-down direction. Thus, the expanded portions S2 (particularly, expanded closed cross-sections) that are expanded downward compared with the central portion of the cross-member closed cross-section S1 are formed at left and right end portions in the vehicle width direction of the cross-member upper portion 50 and the cross-member lower portion 60.

Front ends 13b of the rear side frames 13 are supported by the left and right vertical walls 65e, 66e located on rear sides of the expanded portions S2 (see FIG. 4). Second deformation facilitating beads are formed on upper sides of the expanded portions S2. Specifically, as shown in FIG. 4 and FIG. 5, on the side of the cross-member upper portion 50, a plurality of second deformation facilitating beads b2, b3, b4, b5 protruding toward a front upper side are formed in each of the cross-member upper portion side parts 55, 57 at positions corresponding to the outer bent portion 42. As shown in FIG. 6 and FIG. 7, on the side of the cross-member lower portion 60, a plurality of second deformation facilitating beads b6, b7, b8 protruding toward a rear lower side are formed in each of the cross-member lower portion side parts 65, 66 at positions corresponding to the outer bent portion 42. The second deformation facilitating beads b2 to b5, b6 to b8 on the upper sides of the expanded portions S2 allow the expanded portions S2 to be easily crushed in a lateral collision of the vehicle.

As shown in FIG. 5, tapered portions 59 as corners that are lowered on the front side and raised on the rear side are each formed continuously in the vehicle width direction between the kick-up side vertical walls 54, 56 and the upper walls 55a, 57a of the cross-member upper portion side parts 55, 57 in the expanded portions S2 of the closed cross-sectional part S1. The deformation facilitating bead b1 and the second deformation facilitating beads b2 to b5 are formed at the tapered portions 59.

Similarly, as shown in FIG. 6, corners 69, 69 each continuous in the vehicle width direction are formed between the upper end walls 65d, 66d and the vertical walls 65e, 66e of the cross-member lower portion side parts 65, 66 in the expanded portions S2 of the closed cross-sectional part 51, and the second deformation facilitating beads b6, b7, b8 are formed at the corners 69, 69.

Thus, the deformation facilitating beads b1 to b5 on the side of the cross-member upper portion 50 are formed at the tapered portions 59 as the corners and the second deformation facilitating beads b6 to b8 on the side of the cross-member lower portion 60 are formed at the corners 69, to thereby allow the tapered portions 59 and the corners 69 that do not easily deform in a lateral collision to be easily crushed.

As shown in FIG. 1 and FIG. 4, a third deformation facilitating bead b9 extending substantially in the vehicle front-rear direction is formed on the upper wall 13c of the front end portion of each rear side frame 13. Thus, the third deformation facilitating bead b9 undergoes upward bending deformation in a lateral collision of the vehicle and can thereby restrain the upper wall of the rear side frame 13 from moving inward parallel to the vehicle width direction.

As shown in FIG. 6 and FIG. 7, openings 68, 68 are bored in the vertical walls 65e, 66e, each at a position under a direction in which the third deformation facilitating bead b9 that is integrally formed on the upper wall 13c of the front end portion of the rear side frame 13 and protrudes upward is extended toward the vehicle front side. Thus, the openings 68, 68 allow the vertical walls 65e, 66e to be easily crushed in a lateral collision of the vehicle.

As shown in FIG. 6 and FIG. 7, a plurality of second deformation facilitating beads b6, b7, b8 are formed, and the openings 68, 68 are each bored under a middle portion in the vehicle width direction of the second deformation facilitating beads b6, b7, b8, particularly under the bead b7 located at the middle in the vehicle width direction of the beads b6 to b8. This facilitates deformation of the middle portions in the vehicle width direction of the vertical walls 65e, 66e in a lateral collision of the vehicle. The arrows F, R, IN, OUT, and UP in the drawings indicate the vehicle front side, the vehicle rear side, the vehicle-width-direction inner side, the vehicle-width-direction outer side, and the vehicle upper side, respectively.

As has been described above, in the lower vehicle-body structure of an electric vehicle in this embodiment, the kick-up 10 having the closed cross-sectional part (cross-member closed cross-section S1) and extending transversely between the pair of left and right side sills 2, 2 in the vehicle width direction is disposed between the front floor panel 1 and the rear floor panel (rear seat pan 12), with the battery unit 21 disposed under both the floor panels 1, 12. Each of the left and right side portions in the vehicle width direction of the kick-up 10 is bent downward from the inner position 13a of the rear side frame 13 toward one of the side sills 2 and connected to the side sill 2. The bending facilitating portion (deformation facilitating bead b1) that facilitates bending under a lateral-collision load is formed outward of the bent portion (inner bent portion 41) of the kick-up 10 and the outer side portion 21a of the battery unit 21, at a position inward of the inner end (inner position 13a) of the rear side frame 13 or at substantially the same position as the inner end (see FIG. 1, FIG. 3, and FIG. 4).

In this configuration, the bending facilitating portion (deformation facilitating bead b1) is formed outward of the bent portion (inner bent portion 41) of the kick-up 10 and the outer side portion 21a of the battery unit 21, at a position inward of the inner end (inner position 13a) of the rear side frame 13 or at substantially the same position as the inner end. Thus, the bending facilitating portion (deformation facilitating bead b1) located outward of the bent portion (inner bent portion 41) of the kick-up 10 bends as a breakage starter in a lateral collision, earlier than the bent portion, so as to reduce the amount of projection (so-called overhang) toward the outer side beyond the bending facilitating portion (deformation facilitating bead b1) and reduce the likelihood of interference with the battery unit 21.

In one embodiment of the present disclosure, the bending facilitating portion is formed by the deformation facilitating bead b1 extending in the vehicle front-rear direction (see FIG. 5 and FIG. 7). In this configuration, the deformation facilitating bead b1 can be easily formed in a pressing process of the floor panel.

In one embodiment of the present disclosure, the closed cross-sectional part (cross-member closed cross-section S1) of the kick-up 10 has the expanded portions S2 that are formed by expanding the left and right end portions in the vehicle width direction of the closed cross-sectional part downward compared with the central portion thereof, and the front ends 13b of the rear side frames 13 are supported by the expanded portions S2. The second deformation facilitating beads b2 to b8 are formed on the upper side of each expanded portion S2 (see FIG. 4, FIG. 6, and FIG. 9). In this configuration, the second deformation facilitating beads b2 to b8 on the upper sides of the expanded portions S2 allow the expanded portions S2 to be easily crushed in a lateral collision.

In one embodiment of the present disclosure, the deformation facilitating bead b1 and the second deformation facilitating beads b2 to b8 are formed at the corners (the tapered portion 59 and the corner 69) between the upper wall and the vertical wall of the closed cross-sectional part (the cross-member closed cross-section S1 including the expanded portions S2) (see FIG. 5 and FIG. 6). In this configuration, the corners (the tapered portion 59 and the corner 69) that do not easily deform can be easily crushed.

In one embodiment of the present disclosure, the third deformation facilitating bead b9 extending substantially in the vehicle front-rear direction is formed on the upper wall 13c of the front end portion of each rear side frame 13 (see FIG. 4). In this configuration, the third deformation facilitating bead b9 undergoes upward bending deformation in a lateral collision and can thereby restrain the upper wall of the rear side frame 13 from moving inward parallel to the vehicle width direction.

Moreover, in one embodiment of the present disclosure, the openings 68 are formed in the vertical walls 65e, 66e, each at a position under the direction in which the third deformation facilitating bead b9 is extended toward the vehicle front side (see FIG. 6 and FIG. 7). In this configuration, the openings 68 formed in the vertical walls 65e, 66e allow the vertical walls 65e, 66e to be easily crushed in a lateral collision.

In addition, in one embodiment of the present disclosure, a plurality of second deformation facilitating beads b6, b7, b8 are formed, and the opening 68 is formed under the middle portion of the second deformation facilitating beads b6 to b8 (see FIG. 6). In this configuration, the openings 68 are each formed under the middle portion of the second deformation facilitating beads b6 to b8, which facilitates deformation of the middle portions of the vertical walls 65e, 66e in a lateral collision.

The components of the present disclosure and those of the above-described embodiment correspond to each other as follows. The rear floor panel of the present disclosure corresponds to the rear seat pan 12 of the embodiment; the closed cross-sectional part to the cross-member closed cross-section S1; the bent portion of the kick-up to the inner bent portion 41; the bending facilitating portion to the deformation facilitating bead b1; and the corner to the tapered portion 59 and the corner 69. However, the components of the present disclosure are not limited to those of the above-described embodiment.

As has been described above, the present disclosure is suitably applied to a lower vehicle-body structure of an electric vehicle in which a kick-up having a closed cross-sectional part and extending transversely between a pair of left and right side sills in a vehicle width direction is disposed between a front floor panel and a rear floor panel, a battery unit being disposed under both the floor panels.

What is claimed is:

1. A lower vehicle-body structure of an electric vehicle, comprising:
a kick-up having a closed cross-sectional part and extending transversely between a pair of left and right side sills in a vehicle width direction, and disposed between a front floor panel and a rear floor panel, each of left and right side portions in the vehicle width direction of the kick-up being bent downward from a position inward of a rear side frame toward one of the left and right side sills, such that each of the left and right side portions includes a bent portion, and each of the left and right side portions is connected to one of the left and right side sills; and
a battery disposed under the front and rear floor panels, and having an outer side,
wherein a bending facilitating portion that facilitates bending under a lateral-collision load is formed outward of the bent portion of at least one of the left and right side portions of the kick-up, and outward of the outer side of the battery, at a position inward of an inner end of the rear side frame or at substantially the same position as the inner end.

2. The lower vehicle-body structure of an electric vehicle according to claim 1, wherein
the bending facilitating portion is formed by a deformation facilitating bead extending in a vehicle front-rear direction.

3. The lower vehicle-body structure of an electric vehicle according to claim 2, wherein
the closed cross-sectional part of the kick-up has expanded portions formed by expanding left and right end portions in the vehicle width direction of the closed cross-sectional part downward compared with a central portion thereof, and front ends of the rear side frames are supported by the expanded portions; and
at least one second deformation facilitating bead is formed on an upper side of each of the expanded portions.

4. The lower vehicle-body structure of an electric vehicle according to claim 3, wherein
the deformation facilitating bead and the second deformation facilitating bead are formed at a corner between an upper wall and a vertical wall of the closed cross-sectional part.

5. The lower vehicle-body structure of an electric vehicle according to claim 1, wherein
a third deformation facilitating bead extending substantially in a vehicle front-rear direction is formed on an upper wall of a front end portion of the rear side frame.

6. The lower vehicle-body structure of an electric vehicle according to claim 2, wherein
a third deformation facilitating bead extending substantially in a vehicle front-rear direction is formed on an upper wall of a front end portion of the rear side frame.

7. The lower vehicle-body structure of an electric vehicle according to claim 3, wherein
a third deformation facilitating bead extending substantially in a vehicle front-rear direction is formed on an upper wall of a front end portion of the rear side frame.

8. The lower vehicle-body structure of an electric vehicle according to claim 4, wherein
a third deformation facilitating bead extending substantially in a vehicle front-rear direction is formed on an upper wall of a front end portion of the rear side frame.

9. The lower vehicle-body structure of an electric vehicle according to claim 5, wherein
an opening is formed in a vertical wall at a position under a direction in which the third deformation facilitating bead is extended toward a vehicle front side.

10. The lower vehicle-body structure of an electric vehicle according to claim 6, wherein
an opening is formed in a vertical wall at a position under a direction in which the third deformation facilitating bead is extended toward a vehicle front side.

11. The lower vehicle-body structure of an electric vehicle according to claim 7, wherein
an opening is formed in a vertical wall at a position under a direction in which the third deformation facilitating bead is extended toward a vehicle front side.

12. The lower vehicle-body structure of an electric vehicle according to claim 8, wherein
an opening is formed in a vertical wall at a position under a direction in which the third deformation facilitating bead is extended toward a vehicle front side.

13. The lower vehicle-body structure of an electric vehicle according to claim 9, wherein
a plurality of the second deformation facilitating beads are formed; and
the opening is formed under a middle portion of the second deformation facilitating beads.

14. The lower vehicle-body structure of an electric vehicle according to claim 10, wherein
a plurality of the second deformation facilitating beads are formed; and
the opening is formed under a middle portion of the second deformation facilitating beads.

15. The lower vehicle-body structure of an electric vehicle according to claim 11, wherein
a plurality of the second deformation facilitating beads are formed; and
the opening is formed under a middle portion of the second deformation facilitating beads.

16. The lower vehicle-body structure of an electric vehicle according to claim 12, wherein
a plurality of the second deformation facilitating beads are formed; and
the opening is formed under a middle portion of the second deformation facilitating beads.

17. The lower vehicle-body structure of an electric vehicle according to claim 1, wherein
the bending facilitating portion is formed outward of the bent portion of each of the left and right side portions of the kick-up.

18. The lower vehicle-body structure of an electric vehicle according to claim 1, wherein
the bending facilitating portion is formed at the position inward of the inner end of the rear side frame.

19. The lower vehicle-body structure of an electric vehicle according to claim 1, wherein
the bending facilitating portion is formed at substantially the same position as the inner end of the rear side frame.

20. The lower vehicle-body structure of an electric vehicle according to claim 1, wherein
the at least one of the left and right side portions of the kick-up includes another bent portion formed outward of the bending facilitating portion.

* * * * *